United States Patent
Watanabe

(10) Patent No.: US 11,111,083 B2
(45) Date of Patent: Sep. 7, 2021

(54) ARTICLE ACCUMULATING APPARATUS

(71) Applicant: ISHIDA CO., LTD., Kyoto (JP)

(72) Inventor: Kousuke Watanabe, Ritto (JP)

(73) Assignee: ISHIDA CO., LTD., Kyoto (JP)

( * ) Notice: Subject to any disclaimer, the term of this patent is extended or adjusted under 35 U.S.C. 154(b) by 0 days.

(21) Appl. No.: 16/776,507

(22) Filed: Jan. 30, 2020

(65) Prior Publication Data

US 2020/0247617 A1    Aug. 6, 2020

(30) Foreign Application Priority Data

Feb. 6, 2019   (JP) .............................. JP2019-020089

(51) Int. Cl.
| | |
|---|---|
| *B65G 47/26* | (2006.01) |
| *B65G 15/22* | (2006.01) |
| *B65G 47/90* | (2006.01) |
| *B25J 9/16* | (2006.01) |
| *B65G 13/02* | (2006.01) |

(52) U.S. Cl.
CPC ........... *B65G 47/261* (2013.01); *B65G 15/22* (2013.01); *B65G 47/901* (2013.01); *B65G 47/905* (2013.01); *B25J 9/1623* (2013.01); *B65G 13/02* (2013.01); *B65G 2203/0233* (2013.01); *B65G 2811/0631* (2013.01)

(58) Field of Classification Search
CPC .... B65G 47/261; B65G 15/22; B65G 47/901; B65G 47/905; B65G 13/02; B65G 2203/0233; B65G 2811/0631; B65B 35/50; B25J 9/1623
See application file for complete search history.

(56) References Cited

U.S. PATENT DOCUMENTS

| | | | | |
|---|---|---|---|---|
| 2012/0204517 A1* | 8/2012 | Stollery | ................ | B65H 29/18 53/447 |
| 2014/0142747 A1* | 5/2014 | Magato | ................ | B65G 47/681 700/230 |

FOREIGN PATENT DOCUMENTS

| | | |
|---|---|---|
| EP | 0424730 A2 | 5/1991 |
| JP | 2012-188231 A | 10/2012 |
| JP | 2018-104179 A | 7/2018 |
| JP | 6371494 B2 | 8/2018 |
| KR | 101901647 B1 | 9/2018 |

OTHER PUBLICATIONS

Search Report from the corresponding European Patent Application No. 20155832.7 dated Jul.-Oct. 2020.

* cited by examiner

*Primary Examiner* — Gene O Crawford
*Assistant Examiner* — Lester Rushin, III
(74) *Attorney, Agent, or Firm* — Shinjyu Global IP

(57) ABSTRACT

An article accumulating apparatus that uses a robot to transfer to a predetermined location and accumulate an article conveyed thereto is disclosed. The article accumulating apparatus includes a conveyance unit, an accumulation unit, and a discharge unit. The conveyance unit is configured to convey the article. The accumulation unit is disposed in series with the conveyance unit and is configured to accumulate the article. The discharge unit is configured to discharge the article in the conveyance unit to an area outside the accumulation unit. The discharge unit is disposed in a robot movable range that is a range in which the robot holds and transfers the article to the accumulation unit.

6 Claims, 3 Drawing Sheets

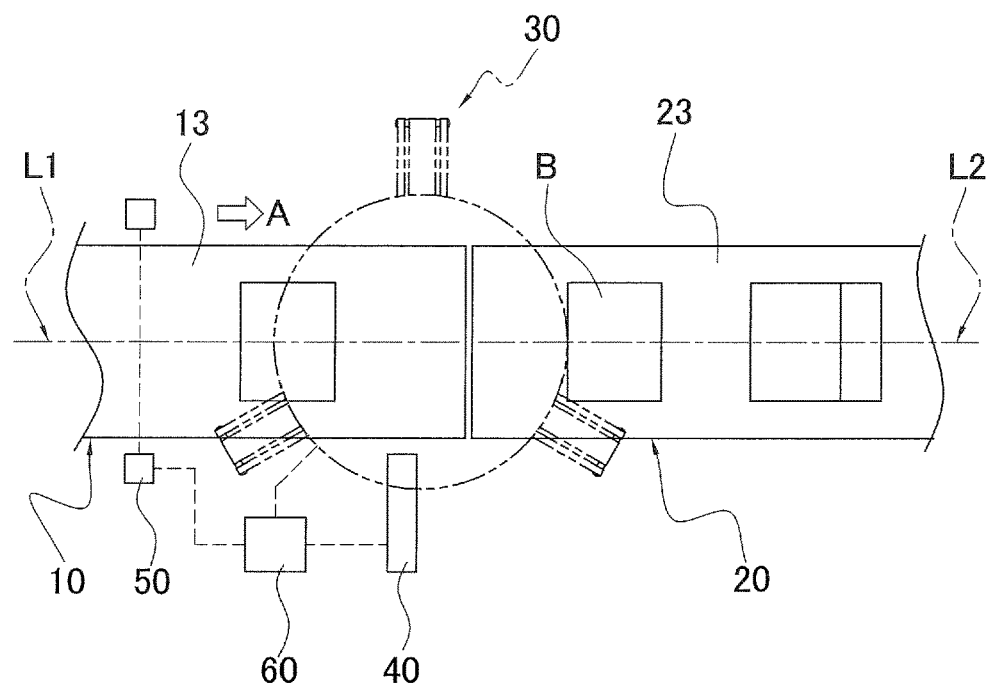
F I G. 1
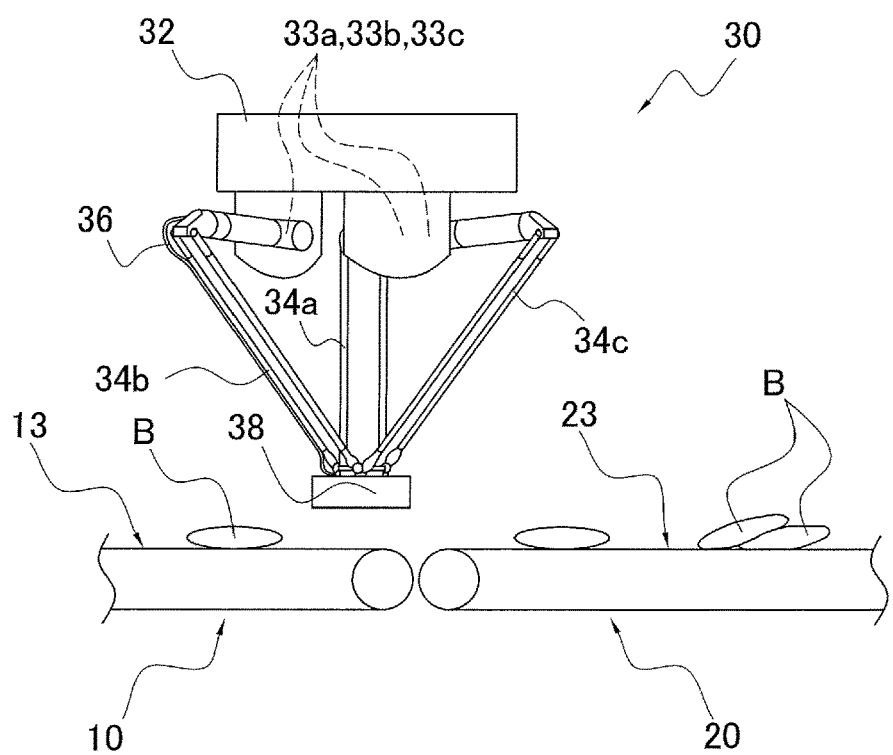
F I G. 2

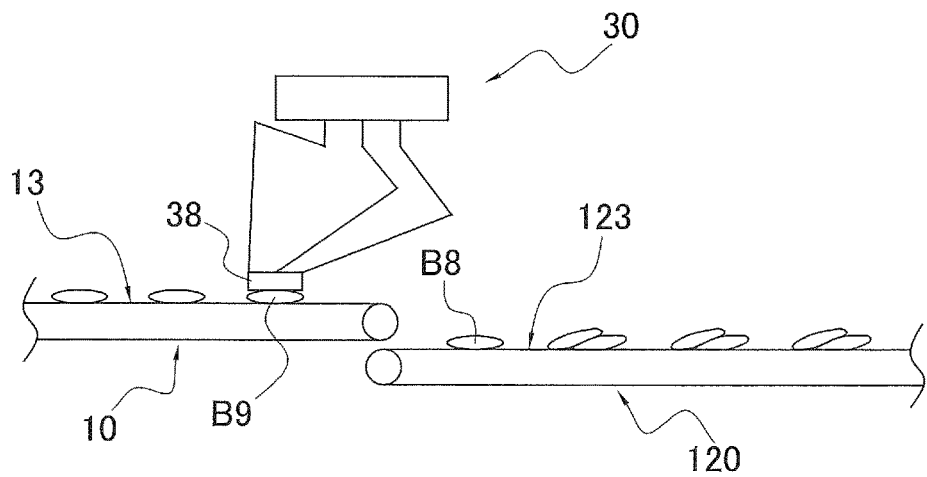
F I G. 4 A
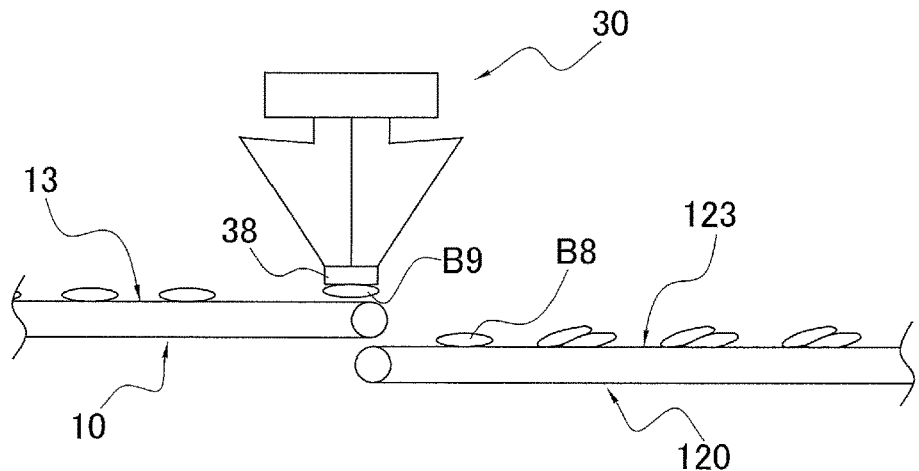
F I G. 4 B
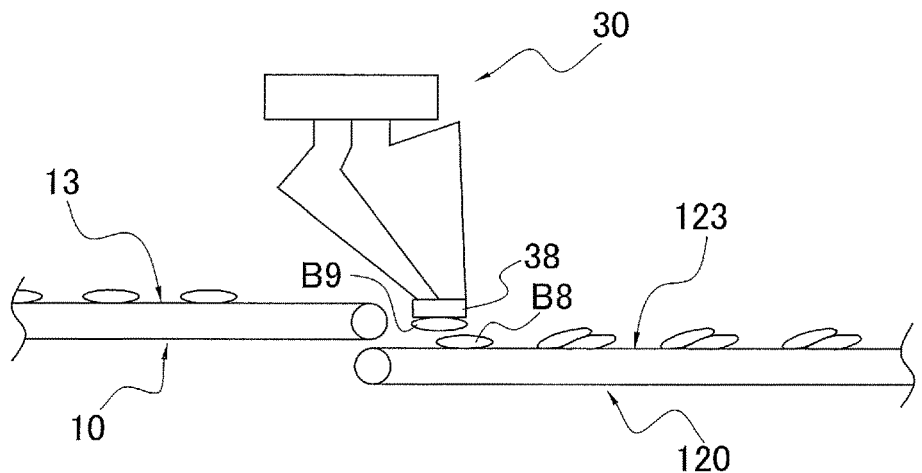
F I G. 4 C

ARTICLE ACCUMULATING APPARATUS

CROSS-REFERENCE TO RELATED APPLICATIONS

This application claims priority to Japanese Patent Application No. 2019-20089, filed on Feb. 6, 2019. The contents of that application are incorporated by reference herein in their entirety.

TECHNICAL FIELD

The present invention relates to an article accumulating apparatus.

BACKGROUND ART

Conventionally, article accumulating apparatus have been utilized as apparatus that convey products with a conveyor and use a robot to transfer the article mid-course to another conveyor. For example, Japanese Patent Application Publication No. 2012-188231 A discloses an article accumulating apparatus where a parallel robot that picks up an article from a conveying conveyor and transfers it to, and accumulates it on, an accumulating conveyor temporarily places the article on a temporary placement table to thereby prevent discharge of the article to the outside of the system caused by overflow.

BRIEF SUMMARY

However, in a case where the accumulating conveyor is disposed in series with the conveying conveyor, there is no temporary placement table as described above, and there is the concern that the article judged as being unable to be picked up by the parallel robot will end up moving as is onto the accumulating conveyor. To prevent this, it is conceivable to leave a little leeway and discharge the article upstream of the movable range of the parallel robot, but in this case a situation can arise where even the article that is actually alright not to discharge become needlessly discharged.

It is an object of the present invention to provide an article accumulating apparatus that can reduce needless discharge of an article.

An article accumulating apparatus pertaining to a first aspect of the invention is an article accumulating apparatus that uses a robot to transfer to a predetermined location and accumulate an article that is conveyed thereto, and comprises a conveyance unit, an accumulation unit, and a discharge unit. The conveyance unit conveys the article. The accumulation unit is disposed in series with the conveyance unit and accumulates the article. The discharge unit discharges, to an area outside the accumulation unit, the article in the conveyance unit. The discharge unit is disposed in a robot movable range that is a range in which the robot can take hold of the article and transfer it to the accumulation unit.

In this article accumulating apparatus, compared to an "article accumulating apparatus of the type that discharges the article upstream of the robot movable range," time in which to judge whether or not the article should be discharged is increased by the amount of time it takes for the article to be conveyed from the upstream end of the robot movable range to the discharge position of the discharge unit, so needless discharge of the article can be reduced.

An article accumulating apparatus pertaining to a second aspect of the invention is the article accumulating apparatus pertaining to the first aspect, wherein the conveyance unit has a conveyance surface on which to place and convey the article. The accumulation unit has an accumulation surface that receives the article that are transferred thereto from the conveyance surface. The shortest distance in the horizontal direction between the conveyance surface and the accumulation surface is equal to or less than the thickness dimension of the article.

In this article accumulating apparatus, even if the robot fails to pick up an article on the conveyance surface, or even if an article that should have been discharged is not discharged by the discharge unit, the article is prevented from falling through the gap between the conveyance surface and the accumulation surface.

An article accumulating apparatus pertaining to a third aspect of the invention is the article accumulating apparatus pertaining to the first aspect, wherein the conveyance unit has a conveyance surface on which to place and convey the article. The accumulation unit has an accumulation surface that receives the article that are transferred thereto from the conveyance surface, and the conveyance surface and the accumulation surface overlap each other in plan view.

An article accumulating apparatus pertaining to a fourth aspect of the invention is the article accumulating apparatus pertaining to any one of the first aspect to the third aspect, and further has an article position detection unit that detects the position of the article and a control unit that determines whether or not to discharge the article.

In this article accumulating apparatus, the position of the article can be detected, so the discharge unit can be disposed in close proximity to the downstream end limit of the robot movable range.

An article accumulating apparatus pertaining to a fifth aspect of the invention is the article accumulating apparatus pertaining to the fourth aspect, wherein the control unit discharges the article via the discharge unit in a case where it judges that the robot cannot take hold of the articles before the article reach a position at which they are able to be discharged by the discharge unit.

In this article accumulating apparatus, the judgment of "whether or not the article will directly transfer from the conveyance unit to the accumulation unit without being taken hold of by the robot" can be continued until the article is near the downstream end limit of the robot movable range, so compared to the "article accumulating apparatus of the type that discharges the article upstream of the robot movable range," the precision of the judgment is improved and needless discharge of the article can be reduced.

An article accumulating apparatus pertaining to a sixth aspect of the invention is the article accumulating apparatus pertaining to any one of the first aspect to the fifth aspect, wherein the articles are conveyed at unequal intervals.

In this article accumulating apparatus, the discharge unit is disposed in the robot movable range, so when the articles are conveyed thereto at short intervals, it suffices to wait until each of the articles is near the downstream end limit of the robot movable range to perform the judgment of "whether or not the article will directly transfer from the conveyance unit to the accumulation unit without being taken hold of by the robot." On the other hand, in a case where the articles are conveyed at long intervals, it suffices to take early hold of the article.

In the article accumulating apparatus pertaining to the invention, compared to an "article accumulating apparatus of the type that discharges the article upstream of the robot movable range," time in which to judge whether or not the article should be discharged is increased by the amount of time it takes for the article to be conveyed from the upstream end of the robot movable range to the discharge position of the discharge unit, so needless discharge of the article can be reduced.

BRIEF DESCRIPTION OF THE DRAWINGS

FIG. 1 is a general plan view of an article accumulating apparatus pertaining to an embodiment of the invention.

FIG. 2 is a general side view of the article accumulating apparatus.

FIG. 4A is a state diagram of the article accumulating operation performed by the parallel link robot of an article accumulating apparatus pertaining to an example modification.

FIG. 4B is a state diagram of the article accumulating operation performed by the parallel link robot of the article accumulating apparatus pertaining to the example modification.

FIG. 4C is a state diagram of the article accumulating operation performed by the parallel link robot of the article accumulating apparatus pertaining to the example modification.

DETAILED DESCRIPTION

Figure 3A:
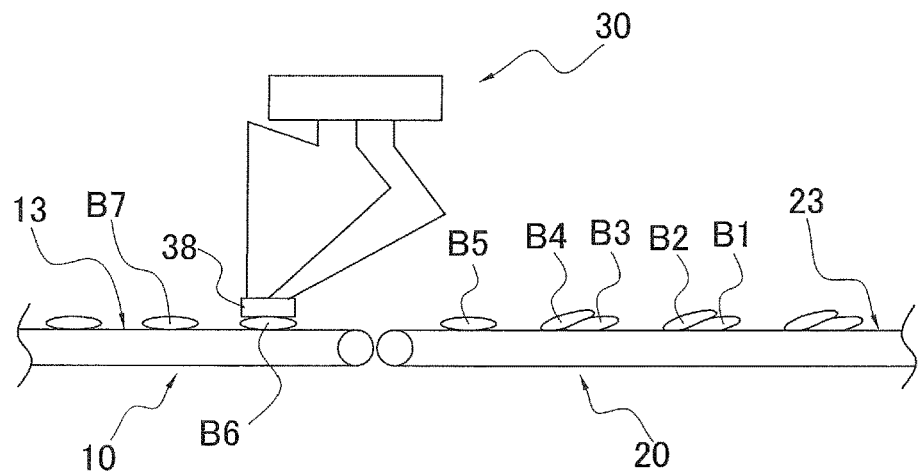
FIG. 3A is a state diagram of an article accumulating operation performed by a parallel link robot.

An embodiment of the invention will be described below with reference to the drawings. It will be noted that the following embodiment is a specific example of the invention and is not intended to limit the technical scope of the invention.

(1) Overall Configuration and Upstream/Downstream Configuration of Article Accumulating Apparatus FIG. 1 is a general plan view of an article accumulating apparatus pertaining to an embodiment of the invention. FIG. 2 is a general side view of the article accumulating apparatus. In FIG. 1 and FIG. 2, the article accumulating apparatus is an apparatus installed on a line in a food factory that produces and box packs a package B filled with potato chips, for example. The article accumulating apparatus is configured from a first conveyor 10 serving as a conveying conveyor, a second conveyor 20 serving as an accumulating conveyor, and a robot 30.

On the line of the food factory, the packages B are produced in a bag-making and packaging machine (not shown in the drawings) disposed upstream of the article accumulating apparatus, undergo a weight inspection and a contamination inspection, and are placed on the first conveyor 10 of the article accumulating apparatus. In the article accumulating apparatus, the package B is transferred by the robot 30 from the first conveyor 10 to the second conveyor 20, and the second conveyor 20 conveys the package B downstream. A box packing apparatus (not shown in the drawings) is disposed downstream of the article accumulating apparatus, and there the packages B are packed into a cardboard box.

(2) Detailed Configuration of Article Accumulating Apparatus (2-1) First Conveyor 10

The first conveyor 10 is a conveyance device for conveying the packages B from upstream of the article accumulating apparats to a robot movable range. Here, the robot movable range is a range in which the robot 30 can take hold of and move the article. As the first conveyor 10, a belt conveyor in which an endless belt is entrained about a drive roller and a follower roller is employed, but a roller conveyor in which numerous rollers are lined up side by side without using a belt can also be employed.

Figure 3B:
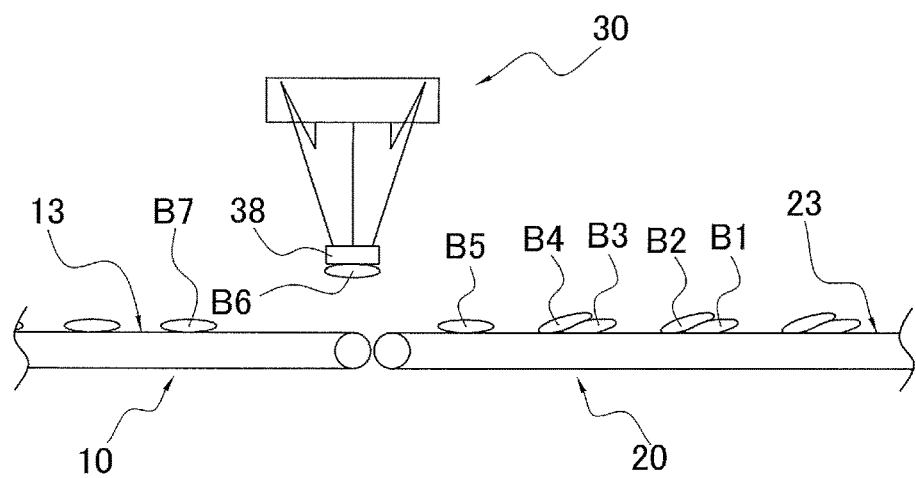
FIG. 3B is a state diagram of the article accumulating operation performed by the parallel link robot.
Figure 3C:
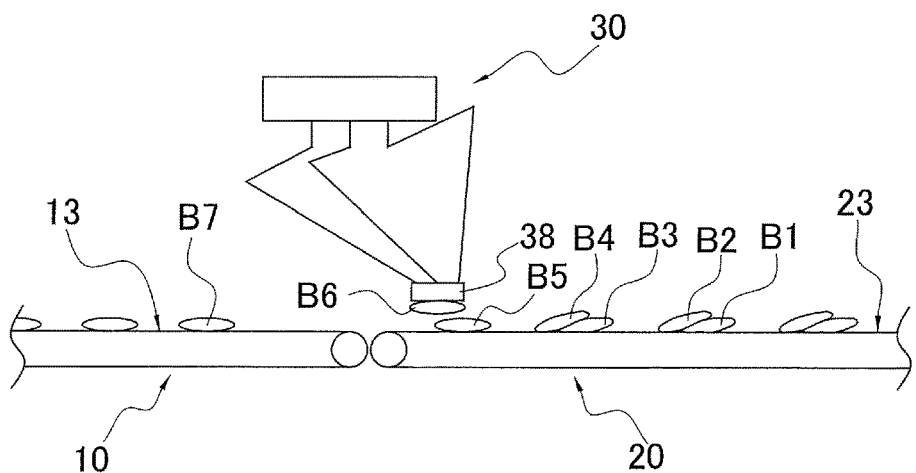
FIG. 3C is a state diagram of the article accumulating operation performed by the parallel link robot.

FIG. 3A to FIG. 3C are state diagrams of an article accumulating operation performed by the robot 30 that is a parallel link robot. In FIG. 3A to FIG. 3C, the packages B form one line along a conveyance direction A (see FIG. 1) on the first conveyor 10, and in that state the packages B are fed in the conveyance direction. Here, the first conveyor 10 feeds the packages B continuously.

(2-2) Second Conveyor 20

The second conveyor 20 is a conveyance device disposed in such a way that its upstream end (front end) is adjacent to the downstream end (rear end) of the first conveyor 10. The second conveyor 20 has the role of conveying downstream the package B that the robot 30 has placed thereon.

The shortest distance in the horizontal direction between an article placement surface 13 of the first conveyor 10 and an article placement surface 23 of the second conveyor 20 is set equal to or less than the thickness dimension of the packages B. Therefore, the packages B are prevented from falling through the gap between the article placement surface 13 of the first conveyor 10 and the article placement surface 23 of the second conveyor 20.

It will be noted that, like the first conveyor 10, a belt conveyor is employed as the second conveyor 20, but it is also possible to employ a roller conveyor.

As shown in FIG. 1, on the second conveyor 20 the packages B form one line or plural lines along the conveyance direction. In this embodiment, an example where the packages B form one line is described.

The conveyance direction of the second conveyor 20 is the same as the conveyance direction A of the first conveyor 10. Specifically, a centerline L2 along the conveyance direction of the second conveyor 20 is aligned with a centerline L1 along the conveyance direction of the first conveyor 10, and the second conveyor 20 is disposed downstream in the conveyance direction A of the first conveyor 10 so as form a straight line with the first conveyor 10.

The packages B that form one line on the second conveyor 20 are placed in such a way that they vertically lie on top of each other as shown in FIG. 1 and FIG. 2. When the packages B are placed in such a way that they vertically lie on top of each other, the second conveyor 20 feeds the packages B downstream a predetermined feed amount. That is, the second conveyor 20 conveys the packages B intermittently.

(2-3) Robot 30

As shown in FIG. 2, the robot 30 is a parallel link robot having three sets of links. The robot 30 has a base 32, three servo motors 33a, 33b, 33c that are attached at equal intervals from each other under the base 32, and parallel link arms 34a, 34b, 34c that are driven by the servo motors 33a, 33b, 33c, respectively.

(2-3-1) Base 32

As shown in FIG. 1, the base 32 is disposed in such a way that it planarly coincides with the downstream end of the first conveyor 10 and the upstream end of the second conveyor 20.

(2-3-2) Parallel Link Arms 34a, 34b, 34c

Upper ends of the parallel link arms 34a, 34b, 34c are coupled to output shafts of the servo motors 33a, 33b, 33c, and lower ends of the parallel link arms 34a, 34b, 34c are coupled to a sucking and holding component 38. The parallel link arms 34a, 34b, 34c extend from the output shafts of the servo motors 33a, 33b, 33c to the sucking and holding component 38.

When the robot 30 operates, the rotational amounts and the rotational directions of the output shafts of the servo motors 33a, 33b, 33c are appropriately controlled so that the lower ends of the parallel link arms 34a, 34b, 34c move in the horizontal direction and the vertical direction and the sucking and holding component 38 moves to arbitrary positions within a fixed three-dimensional space.

(2-3-3) Sucking and Holding Component 38

The sucking and holding component 38 of the robot 30 has plural suction pads (not shown in the drawings) on its lower portion. Each of the suction pads is connected to a suction tube 36 that extends from a vacuum pump or a vacuum blower (not shown in the drawings), and the suction pads switch between a state in which they suck and hold the package B and a state in which they release the package B. When the suction pads suck and release the package B, the sucking and holding component 38 grasps and releases the package B.

Specifically, the sucking and holding component 38 grasps the package B on the first conveyor 10, the parallel link arms 34a, 34b, 34c lift up and planarly move the sucking and holding component 38 that is grasping the package B, and the sucking and holding component 38 releases the package B over the second conveyor 20. Because of this, the package B separate from the sucking and holding component 38 and is placed on the second conveyor 20 (see FIG. 3A to FIG. 3C).

It will be noted that in FIG. 1 the package B located near the downstream end of the first conveyor 10 and the package B located near the upstream end of the second conveyor 20 are both within the movable range of the robot 30.

(2-4) Air-Jet Device 40

In this embodiment, the article accumulating apparatus performs an accumulating operation with the robot 30 while constantly moving the first conveyor 10 to continuously convey one line of the packages B, and depending on the conveyance speed of the first conveyor 10 and the operating status of the robot 30, the package B may end up transferring from the downstream end of the first conveyor 10 to the second conveyor 20.

Therefore, an air-jet device 40, which blows out a jet stream of air from the side of the first conveyor 10 to discharge the package B from the first conveyor 10, is disposed in the neighborhood of the downstream end of the first conveyor 10. Because of this, it becomes possible to sort, to the outside of the line, the package B that was unable to be processed by the robot 30 and return it back to the upstream side of the line.

(2-5) Article Position Detection Sensor 50

An article position detection sensor 50 is a sensor that detects that the package B has passed a predetermined detection position. In this embodiment, the article position detection sensor 50 is disposed upstream of the robot movable range, and on the side of the first conveyor 10, on the upstream side in the conveyance direction of the first conveyor 10.

(2-6) Controller 60

A controller 60 computes, from the detection signal of the article position detection sensor 50 and the output of an encoder (not shown in the drawings) with which the first conveyor 10 is equipped, the position of the package B after the package B has passed the detection position and controls the operation of the robot 30 and the air-jet device 40 on the basis of the positions.

(3) Operation of Article Accumulating Apparatus

Here, an operation where the packages B conveyed in one line by the first conveyor 10 as described above are transferred by the robot 30 to one line on the second conveyor 20 will be described.

(3-1) Accumulating Operation

A package B conveyed on the article placement surface 13 of the belt of the first conveyor 10 is taken hold of (see package B6 in FIG. 3A) and lifted up by the robot 30 positioned over the neighborhood of the downstream end of the first conveyor 10 and the neighborhood of the upstream end of the second conveyor 20. The sucking and holding component 38 of the robot 30 that is sucking and holding the package B6 moves in the horizontal direction in a state in which it has lifted up the package B6 from the first conveyor 10 (see FIG. 3B) and heads over the second conveyor 20. A package B5 that was transferred before the package B6 is already placed on the second conveyor 20, and as shown in FIG. 3C the robot 30 moves the package B6 to a position diagonally above the package B5. From the state shown in FIG. 3C, the robot 30 cancels the sucking and holding of the package B6 by the sucking and holding component 38 so that the package B6 is placed on the package B5 and the second conveyor 20.

It will be noted that packages B1, B2 and packages B3, B4 that vertically lie on top of each other and are on the article placement surface 23 of the second conveyor 20 as shown in FIG. 3A are packages B that were transferred before the package B5, and they have been intermittently conveyed one time each after transfer. Furthermore, as shown in FIG. 3A to FIG. 3C, the first conveyor 10 continuously moves even during the package B accumulating operation performed by the robot 30, so that the position of a package B7 coming after the package B6 currently being transferred gradually moves downstream.

(3-2) Discharge Operation

Upstream of the first conveyor 10, the packages B are produced in the bag-making and packaging machine, undergo the weight inspection and the contamination inspection, and are placed on the first conveyor 10. Even if the packages B are being produced at a rate of 80 per minute in the bag-making and packaging machine, the packages B flowing on the first conveyor 10 are not necessarily conveyed at intervals of 80 per minute but are actually conveyed with about 20% variance, that is, at intervals corresponding to 60 per minute to 100 per minute.

In this case, when the controller 60 judges that the packages B are being conveyed on the first conveyor 10 at intervals corresponding to a production rate of 60 per minute, it suffices to take early hold of the package B that has entered the robot movable range and transfer it to, and accumulate it on, the second conveyor 20.

On the other hand, when the controller 60 judges that the packages B are being conveyed on the first conveyor 10 at intervals corresponding to a production rate of 100 per minute, the controller 60 judges whether or not the robot 30 can take hold of and transfer to the second conveyor 20 the package B that has entered the robot movable range before the package B reaches a discharge point at which the air-jet device 40 discharges the package B, and when the controller 60 judges that the robot 30 cannot transfer the package B, the package B is discharged by the air-jet device 40 at the discharge point.

(4) Characteristics of Article Accumulating Apparatus (4-1)

In the article accumulating apparatus, the air-jet device 40 serving as a discharge unit is disposed in the robot movable range, so compared to an "article accumulating apparatus of the type that discharges the article upstream of the robot movable range," time in which to judge whether or not the package B that is the article should be discharged is increased by the amount of time it takes for the package B to be conveyed from the upstream end of the robot movable range to the discharge position, so needless discharge of the package B can be reduced.

(4-2)

The shortest distance in the horizontal direction between the article placement surface 13 of the first conveyor 10 and the article placement surface 23 of the second conveyor 20 is equal to or less than the thickness dimension of the package B, so even if the robot 30 fails to pick up a package B on the article placement surface 13 of the first conveyor 10, or even if a package B that should have been discharged is not discharged at the discharge point, the package B is prevented from falling through the gap between the article placement surface 13 of the first conveyor 10 and the article placement surface 23 of the second conveyor 20.

(4-3)

The controller 60 can compute, from the detection signal of the article position detection sensor 50 and the output of the encoder with which the first conveyor 10 is equipped, the position of the package B after the package B has passed the detection position, so the air-jet device 40 that is a discharge unit can be disposed in close proximity to the downstream end limit of the robot movable range.

(4-4)

The controller 60 discharges the article via the air-jet device 40 in a case where it judges that the robot 30 cannot take hold of the package B before the package B reaches the position at which it is able to be discharged by the air-jet device 40 that is a discharge unit. As a result, the judgment of "whether or not the package B will directly transfer from the first conveyor 10 to the second conveyor 20 without being taken hold of by the robot 30" can be continued until the package B is near the downstream end limit of the robot movable range, so compared to the "article accumulating apparatus of the type that discharges the package B upstream of the robot movable range," the precision of the judgment is improved and needless discharge of the package B can be reduced.

(4-5)

Even when the packages B are conveyed at unequal intervals, the air-jet device 40 that is a discharge unit is disposed in the robot movable range, so when the packages B are conveyed at short intervals, it suffices to wait until the packages B are near the downstream end limit of the robot movable range to perform the judgment of "whether or not the packages B will directly transfer from the first conveyor 10 to the second conveyor 20 without being taken hold of by the robot." On the other hand, in a case where the packages B are conveyed at long intervals, it suffices to take early hold of the package.

(5) Example Modification

In the above embodiment, as shown in FIG. 2 and FIG. 3A to FIG. 3C, both conveyors 10, 20 are installed in such a way that the height positions of the article placement surface 13 of the first conveyor 10 and the article placement surface 23 of the second conveyor 20 are the same. This arrangement is preferred in a case where the article accumulating apparatus is used to place the package B on the second conveyor 20 without putting the packages B on top of each other.

However, if the article accumulating apparatus is often used to vertically stack plural packages B on top of each other on the second conveyor 20, it is also effective to change the height positions of the article placement surfaces of both conveyors.

FIG. 4A to FIG. 4C are state diagrams of the article accumulating operation performed by the parallel link robot of an article accumulating apparatus pertaining to an example modification. In FIG. 4A to FIG. 4C, instead of the second conveyor 20 of the above embodiment, the article accumulating apparatus employs a second conveyor 120 in which the height position of its article placement surface 123 is lower than that of the article placement surface 13 of the first conveyor 10.

In this example modification, both conveyors are disposed with a height difference between the article placement surface 13 of the first conveyor 10 and the article placement surface 123 of the second conveyor 120, so it is no longer necessary to lift the package B6 up high as in the above embodiment (see FIG. 3B and FIG. 3C), and by lifting up a package B9 just a little and moving it horizontally over the second conveyor 120 as shown in FIG. 4B and FIG. 4C, the package B9 becomes positioned above the package B8 that is on the second conveyor 120.

As a result, the transfer path of the operation of the robot 30 that transfers the package B9 becomes shorter by the extent of the height difference between both conveyors 10, 120, and the amount of time needed for transfer becomes shorter.

Furthermore, the article placement surface 13 of the first conveyor 10 and the article placement surface 123 of the second conveyor 120 overlap each other in plan view, so the package B do not fall through the gap between the conveyors.

REFERENCE SIGNS LIST

10 First Conveyor (Conveyance Unit)
13 Article Placement Surface (Conveyance Surface)
20 Second Conveyor (Accumulation Unit)
23 Article Placement Surface (Accumulation Surface)
30 Robot
40 Air-jet Device (Discharge Unit)
50 Article Position Detection Sensor (Article Position Detection Unit)
60 Controller (Control Unit)
120 Second Conveyor (Accumulation Unit)
123 Article Placement Surface (Accumulation Surface)
B Package (Article)

What is claimed is:

1. An article accumulating apparatus that uses a robot to transfer to a predetermined location and accumulate an article conveyed thereto, the article accumulating apparatus comprising:
   a conveyance unit configured to convey the article;
   an accumulation unit disposed in series with the conveyance unit and configured to accumulate the article; and
   a discharge unit configured to discharge the article in the conveyance unit to an area outside the accumulation unit,
   wherein the discharge unit is disposed in a robot movable range that is a range in which the robot holds and transfers the article to the accumulation unit, the discharge unit further configured to discharge the article outside of the robot movable range.

2. The article accumulating apparatus according to claim 1, wherein
   the conveyance unit has a conveyance surface to place and convey the article thereon,
   the accumulation unit has an accumulation surface that receives the article transferred thereto from the conveyance surface, and
   a shortest distance in a horizontal direction between the conveyance surface and the accumulation surface is equal to or less than a thickness of the article.

3. The article accumulating apparatus according to claim 1, wherein
   the conveyance unit has a conveyance surface to place and convey the article thereon,
   the accumulation unit has an accumulation surface that receives the article transferred thereto from the conveyance surface, and
   the conveyance surface and the accumulation surface overlap each other in plan view.

4. The article accumulating apparatus according to claim 1, further comprising
   an article position detection unit configured to detect a position of the article and
   a control unit configured to determine whether or not to discharge the article.

5. The article accumulating apparatus according to claim 4, wherein the control unit is further configured to discharge the article via the discharge unit in a case where it is determined that the robot does not hold the article before the article reaches a position to be discharged by the discharge unit.

6. The article accumulating apparatus according to claim 1, wherein the articles are conveyed at unequal intervals.

* * * * *